US011655335B2

(12) United States Patent
Seo et al.

(10) Patent No.: US 11,655,335 B2
(45) Date of Patent: May 23, 2023

(54) THERMOPLASTIC RESIN COMPOSITION AND MOLDED ARTICLE FORMED THEREFROM

(71) Applicant: LOTTE CHEMICAL CORPORATION, Seoul (KR)

(72) Inventors: Yeong Deuk Seo, Uiwang-si (KR); Kyoung Tae Youm, Uiwang-si (KR); Sang Hwa Lee, Uiwang-si (KR); Sang Hyun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 327 days.

(21) Appl. No.: 16/958,831

(22) PCT Filed: Dec. 31, 2018

(86) PCT No.: PCT/KR2018/016971
§ 371 (c)(1),
(2) Date: Jun. 29, 2020

(87) PCT Pub. No.: WO2019/132630
PCT Pub. Date: Jul. 4, 2019

(65) Prior Publication Data
US 2021/0070935 A1 Mar. 11, 2021

(30) Foreign Application Priority Data

Dec. 31, 2017 (KR) .......................... 10-2017-0185029
Dec. 28, 2018 (KR) .......................... 10-2018-0172031

(51) Int. Cl.
C08G 69/32 (2006.01)
C08K 3/22 (2006.01)
C08K 3/26 (2006.01)
C08L 77/10 (2006.01)
C08L 23/08 (2006.01)

(52) U.S. Cl.
CPC ............... C08G 69/32 (2013.01); C08K 3/22 (2013.01); C08K 3/26 (2013.01); C08L 23/08 (2013.01); C08L 77/10 (2013.01); C08K 2003/2296 (2013.01); C08K 2003/265 (2013.01)

(58) Field of Classification Search
CPC . C08G 69/32; C08K 3/22; C08K 3/26; C08K 2003/2296; C08K 2003/265; C08L 23/08; C08L 77/10; C08L 77/06; C08L 23/0815; C08L 23/26
See application file for complete search history.

(56) References Cited

U.S. PATENT DOCUMENTS 3,914,520 A * 10/1975 Hovey ................... C23C 18/28
428/458
5,763,561 A 6/1998 Keske
5,962,628 A 10/1999 Keske
2007/0072967 A1* 3/2007 Nass .................... C08K 5/5313
524/126
2007/0117901 A1 5/2007 Suzuki et al.
2009/0239990 A1* 9/2009 Weber ..................... C08L 77/00
524/514
2018/0244919 A1 8/2018 Kim et al.

FOREIGN PATENT DOCUMENTS

| EP | 0690098 A2 | 1/1996 |
| EP | 0690098 A2 | 10/1996 |
| EP | 0827976 A | 3/1998 |
| JP | 01-103665 A | 4/1989 |
| JP | 10-272727 A | 10/1998 |
| JP | 3512525 B2 | 3/2004 |
| KR | 10-2010-0123178 A | 11/2010 |
| KR | 10-2017-0024201 A | 3/2017 |
| WO | WO 00/78869 | * 12/2000 |
| WO | 2013/026778 A1 | 2/2013 |
| WO | 2019/132630 A1 | 7/2019 |

OTHER PUBLICATIONS

Office Action in counterpart Korean Application No. 10-2018-0172031 dated Nov. 16, 2020, pp. 1-4.
International Search Report in counterpart International Application No. PCT/KR2018/016971 dated Apr. 9, 2019, pp. 1-6.
Office Action in counterpart Chinese Application No. 201880089579.X dated Aug. 17, 2022, pp. 1-9.

* cited by examiner

Primary Examiner — Doris L Lee
(74) Attorney, Agent, or Firm — Additon, Pendleton & Witherspoon, P.A.

(57) ABSTRACT

A thermoplastic resin composition of the present invention comprises: about 45 wt % to about 65 wt % of an aromatic polyamide resin comprising at least one of a repeat unit represented by Formula 1, a repeat unit represented by Formula 2, and a repeat unit represented by Formula 3; about 1 wt % to about 20 wt % of an olefin copolymer; about 15 wt % to about 35 wt % of calcium carbonate; and about 5 wt % to about 25 wt % of zinc oxide, wherein the weight ratio of the calcium carbonate and the zinc oxide (calcium carbonate:zinc oxide) is about 5:1 to about 1:1. The thermoplastic resin composition and a molded article formed therefrom have good properties in terms of plating adhesion, appearance, heat resistance, etc.

8 Claims, 1 Drawing Sheet

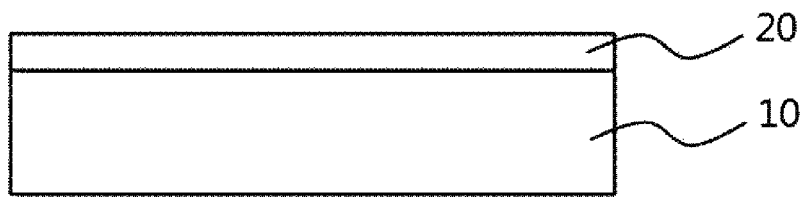

THERMOPLASTIC RESIN COMPOSITION AND MOLDED ARTICLE FORMED THEREFROM

CROSS-REFERENCE TO RELATED APPLICATIONS

This application claims priority to and the benefit of International Application No. PCT/KR2018/016971, filed Dec. 31, 2018, which published as WO 2019/132630 on Jul. 4, 2019; Korean Patent Application No. 10-2017-0185029, filed in the Korean Intellectual Property Office on Dec. 31, 2017; and Korean Patent Application No. 10-2018-0172031, filed in the Korean Intellectual Property Office on Dec. 28, 2018, the entire disclosure of each of which is incorporated herein by reference.

TECHNICAL FIELD

The present invention relates to a thermoplastic resin composition and a molded article formed of the same. More particularly, the present invention relates to a thermoplastic resin composition which has good properties in terms of plating adhesion, heat resistance, and appearance, and a molded article formed of the same.

BACKGROUND ART

Thermoplastic resins, such as polyamide resins, are useful as materials for housings of electrical/electronic products, interior/exterior materials for automobiles, and exterior materials for buildings due to lower specific gravity than glass or metal and good properties in terms of heat resistance, abrasion resistance, chemical resistance, and the like. Particularly, with the trend toward larger and lighter electric/electronic products, plastic products manufactured using thermoplastic resins are rapidly replacing glass or metal products.

Further, in order to implement aesthetic features by providing a metallic appearance while maintaining such advantages of a polyamide resin, a technique of plating the polyamide resin has been developed. Plating of the polyamide resin is performed for the purpose of decoration and corrosion resistance, and crucial elements thereof are appearance after plating and adhesion (plating adhesion or plateability) between a plating layer and the resin.

To this end, there has been developed a method of adding an inorganic material or an epoxy group-containing polyolefin to a polyamide resin composition in order to improve plateability. However, this method has a drawback of deterioration in impact resistance of the resin composition, and thus a range of application thereof is limited. In addition, there has been proposed a method of alloying a polyamide resin with an acrylonitrile-butadiene-styrene (ABS) resin or a polycarbonate resin in order to improve plateability of the resin composition. However, this method has a problem of deterioration of heat resistance of the resin composition.

Therefore, there is a need for a thermoplastic resin composition which has good plating adhesion (plateability), appearance, heat resistance, and mechanical properties.

The background technique of the present invention is disclosed in Korean Patent Laid-open Publication No. 10-2010-0123178 and the like.

DISCLOSURE

Technical Problem

It is one aspect of the present invention to provide a thermoplastic resin composition which has good properties in terms of plating adhesion (plateability), heat resistance, and appearance.

It is another aspect of the present invention to provide a molded article formed of the thermoplastic resin composition set forth above.

The above and other aspects of the present invention will become apparent from the detailed description of the following embodiments.

Technical Solution

1. One aspect of the present invention relates to a thermoplastic resin composition. The thermoplastic resin composition comprises: about 45 wt % to about 65 wt % of an aromatic polyamide resin comprising at least one of a repeat unit represented by Formula 1, a repeat unit represented by Formula 2, and a repeat unit represented by Formula 3; about 1 wt % to about 20 wt % of an olefin copolymer; about 15 wt % to about 35 wt % of calcium carbonate; and about 5 wt % to about 25 wt % of zinc oxide, wherein the calcium carbonate and the zinc oxide are present in a weight ratio (calcium carbonate:zinc oxide) of about 5:1 to about 1:1,

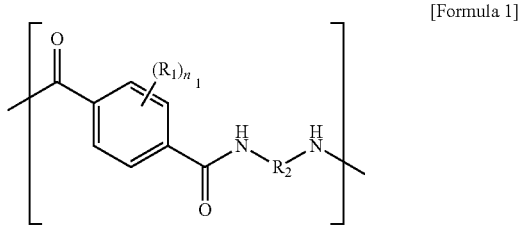

[Formula 1]

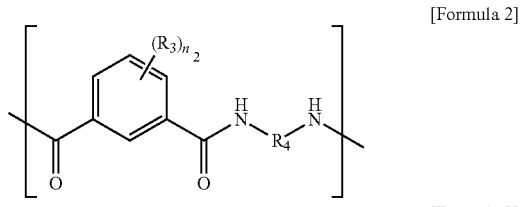

[Formula 2]

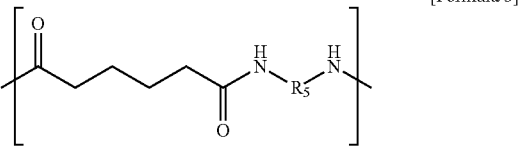

[Formula 3]

where $R_1$ and $R_3$ are each independently a $C_1$ to $C_6$ hydrocarbon group or a halogen atom, $R_2$, $R_4$ and $R_5$ are each independently a $C_6$ to $C_{12}$ linear or branched alkylene group, and $n_1$ and $n_2$ are each independently an integer of 0 to 4.

2. In Embodiment 1, the aromatic polyamide resin may comprise about 60 mol % to about 80 mol % of the repeat unit represented by Formula 1 and 20 mol % to about 40 mol % of the repeat unit represented by Formula 2.

3. In Embodiment 1 or 2, the aromatic polyamide resin may comprise about 60 mol % to about 80 mol % of the repeat unit represented by Formula 1 and 20 mol % to about 40 mol % of the repeat unit represented by Formula 3.

4. In Embodiments 1 to 3, the aromatic polyamide resin may comprise about 55 mol % to about 75 mol % of the repeat unit represented by Formula 1, 20 mol % to about 30 mol % of the repeat unit represented by Formula 2, and about 5 mol % to about 15 mol % of the repeat unit represented by Formula 3.

5. In Embodiments 1 to 4, the olefin copolymer may comprise: an ethylene-α-olefin copolymer or a modified ethylene-α-olefin copolymer obtained by graft-polymerization of at least one compound of an α,β-unsaturated dicarboxylic acid and an α,β-unsaturated dicarboxylic acid derivative to the ethylene-α-olefin copolymer.

6. In Embodiments 1 to 5, the at least one compound of the α,β-unsaturated dicarboxylic acid and the α,β-unsaturated dicarboxylic acid derivative may comprise at least one of maleic acid, maleic anhydride, maleic hydrazide, dichloromaleic anhydride, and fumaric acid.

7. In Embodiments 1 to 6, the olefin copolymer may comprise a maleic anhydride-modified ethylene-octene copolymer.

8. In Embodiments 1 to 7, the thermoplastic resin composition may have a plating adhesion strength of about 13 N/cm to about 30 N/cm, as measured on an injection molded specimen having a size of 10 cm×10 cm×3.2 mm and plated with a 30 μm thick chromium layer at a peeling rate of 50 mm/min using a tensile tester in accordance with JIS C6481.

9. Another aspect of the present invention relates to a molded article. The molded article comprises: a base layer; and a plating layer formed on at least one surface of the base layer, wherein the base layer is formed of the thermoplastic resin composition according to any one of embodiments 1 to 8.

Advantageous Effects

The present invention provides a thermoplastic resin composition which has good properties in terms of plating adhesion (plateability), heat resistance, and appearance, and a molded article formed of the same.

DESCRIPTION OF DRAWINGS

FIG. 1 is a schematic sectional view of a molded article according to one embodiment of the present invention.

BEST MODE

Hereinafter, exemplary embodiments of the present invention will be described in detail.

A thermoplastic resin composition according to the present invention comprises: (A) an aromatic polyamide resin; (B) an olefin copolymer; (C) calcium carbonate; and (D) zinc oxide.

As used herein to represent a specific numerical range, the expression "a to b" means "≥a and ≤b".

(A) Aromatic Polyamide Resin

The aromatic polyamide resin according to the present invention comprises at least two dicarboxylic acid units to improve plating adhesion (plateability) between a plating layer and a molded article manufactured using the thermoplastic resin composition upon plating of the molded article, and comprises at least one repeat unit of a repeat unit represented by Formula 1, a repeat unit represented by Formula 2, and a repeat unit represented by Formula 3.

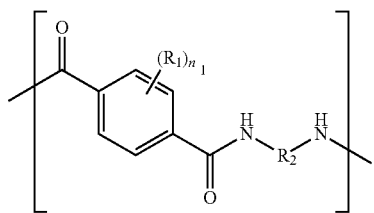

[Formula 1]

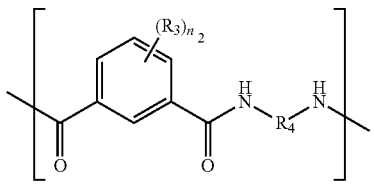

[Formula 2]

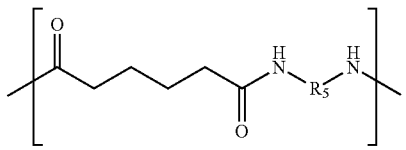

[Formula 3]

Wherein, $R_1$ and $R_3$ are each independently a $C_1$ to $C_6$ hydrocarbon group or a halogen atom, $R_2$, $R_4$, and $R_5$ are each independently a $C_6$ to $C_{12}$ linear or branched alkylene group, and $n_1$ and $n_2$ are each independently an integer of 0 to 4.

In some embodiments, the aromatic polyamide resin may comprise about 60 mol % to about 80 mol %, for example, about 65 mol % to about 75 mol %, of the repeat unit represented by Formula 1 and about 20 mol % to about 40 mol %, for example, about 25 mol % to about 35 mol %, of the repeat unit represented by Formula 2. Within this range, the thermoplastic resin composition can have good properties in terms of plating adhesion and heat resistance. Here, the aromatic polyamide resin may be prepared by reacting a dicarboxylic acid component comprising about 60 mol % to about 80 mol %, for example, about 65 mol % to about 75 mol %, of terephthalic acid having a phenyl group substituted or unsubstituted with $R_1$ or an alkyl ester thereof and about 20 mol % to about 40 mol %, for example, about 25 mol % to about 35 mol %, of isophthalic acid having a phenyl group substituted or unsubstituted with $R_3$ or an alkyl ester thereof with an aliphatic diamine component having a $C_6$ to $C_{12}$ linear or branched alkylene group (1,6-hexanediamine (hexamethylene diamine (HMDA)), 1,6-hexanediamine, 1,7-heptanediamine, 1,8-octanediamine, 1,9-nonanediamine, 1,10-decanediamine, 1,11-undecanediamine, 1,12-dodecanediamine, and the like) by any suitable polymerization method known in the art.

In some embodiments, the aromatic polyamide resin may comprise about 60 mol % to about 80 mol %, for example, about 65 mol % to about 75 mol %, of the repeat unit represented by Formula 1 and about 20 mol % to about 40 mol %, for example, about 25 mol % to about 35 mol %, of the repeat unit represented by Formula 3. Within this range, the thermoplastic resin composition can have good properties in terms of plating adhesion and heat resistance. Here, the aromatic polyamide resin may be prepared by reacting a dicarboxylic acid component comprising about 60 mol % to about 80 mol %, for example, about 65 mol % to about 75 mol %, of terephthalic acid having a phenyl group substituted or unsubstituted with $R_1$ or an alkyl ester thereof and about 20 mol % to about 40 mol %, for example, about 25 mol % to about 35 mol %, of adipic acid or an alkyl ester thereof with an aliphatic diamine component having a $C_6$ to $C_{12}$ linear or branched alkylene group by any suitable polymerization method known in the art.

In some embodiments, the aromatic polyamide resin may comprise about 55 mol % to about 75 mol %, for example, about 60 mol % to about 70 mol %, of the repeat unit represented by Formula 1, about 20 mol % to about 30 mol %, for example, about 22 mol % to about 30 mol %, of the repeat unit represented by Formula 2, and about 5 mol % to about 15 mol %, for example, about 8 mol % to about 12 mol %, of the repeat unit represented by Formula 3. Within this range, the thermoplastic resin composition can have good properties in terms of plating adhesion and heat resistance. Here, the aromatic polyamide resin may be prepared by reacting a dicarboxylic acid component comprising about 55 mol % to about 75 mol %, for example, about 60 mol % to about 70 mol %, of terephthalic acid having a phenyl group substituted or unsubstituted with $R_1$ or an alkyl ester thereof, about 20 mol % to about 30 mol %, for example, about 22 mol % to about 28 mol % of isophthalic acid having a phenyl group substituted or unsubstituted with $R_3$ or an alkyl ester thereof, and about 5 mol % to about 15 mol %, for example, about 8 mol % to about 12 mol %, of adipic acid or an alkyl ester thereof with an aliphatic diamine component having a $C_6$ to $C_{12}$ linear or branched alkylene group by any suitable polymerization method known in the art. In addition, the aromatic polyamide resin may be prepared by mixing an aromatic polyamide resin comprising the repeat unit represented by Formula 1 and the repeat unit represented by Formula 2 with an aliphatic polyamide resin comprising the repeat unit represented by Formula 3 such that the contents of the repeat unit represented by Formula 1, the repeat unit represented by Formula 2, and the repeat unit represented by Formula 3 fall within the respective ranges set forth above in the prepared aromatic polyamide resin.

In some embodiments, the aromatic polyamide resin may have a glass transition temperature of about 80° C. to about 150° C., for example, about 85° C. to about 140° C., and a melting point of about 250° C. to about 350° C., for example, about 280° C. to about 330° C., as measured by differential scanning calorimetry (DSC). Within this range, the thermoplastic resin composition can have good heat resistance.

In addition, the aromatic polyamide resin may have an intrinsic viscosity [η] of about 0.7 dL/g to about 1.2 dL/g, for example, about 0.8 dL/g to about 1.0 dL/g, as measured using an Ubbelohde viscometer at 25° C. after dissolving the aromatic polyamide resin in a strong (98%) sulfuric acid solution to a concentration of 0.5 g/dL. Within this range, the polyamide resin composition can have good properties in terms of processability and appearance.

In some embodiments, the aromatic polyamide resin may be present in an amount of about 45 wt % to about 65 wt %, for example, about 50 wt % to about 60 wt %, based on the total weight of the components (A) to (D). If the amount of the aromatic polyamide resin is less than about 45 wt %, the thermoplastic resin composition can have poor properties in terms of plating adhesion and heat resistance, whereas, if the amount of the aromatic polyamide resin exceeds about 65 wt %, the thermoplastic resin composition can have poor properties in terms of plating adhesion and flowability.

(B) Olefin Copolymer

The olefin copolymer according to the present invention serves to improve plating adhesion (plateability) between a plating layer and a molded article manufactured using the thermoplastic resin composition upon plating of the molded article and to improve impact resistance of the thermoplastic resin composition, and may be a copolymer of olefin monomers or a copolymer of an olefin monomer and an acrylic monomer.

In some embodiments, the olefin monomer may comprise $C_1$ to $C_{19}$ alkylenes, for example, ethylene, propylene, isopropylene, butylene, isobutylene, octene, and combinations thereof, and the acrylic monomer may comprise (meth) acrylic acid alkyl esters. Here, the term "alkyl" refers to a $C_1$ to $C_{10}$ alkyl group, and examples of the (meth)acrylic acid alkyl esters may comprise methyl (meth)acrylate, ethyl (meth)acrylate, propyl (meth)acrylate, and butyl (meth)acrylate.

In some embodiments, the olefin copolymer may comprise an ethylene-α-olefin copolymer or a modified ethylene-α-olefin copolymer obtained by graft-polymerization of at least one compound of an α,β-unsaturated dicarboxylic acid and an α,β-unsaturated dicarboxylic acid derivative to the ethylene-α-olefin copolymer.

In some embodiments, the at least one compound of the α,β-unsaturated dicarboxylic acid and the α,β-unsaturated dicarboxylic acid derivative may comprise at least one of maleic acid, maleic anhydride, maleic hydrazide, dichloromaleic anhydride, and fumaric acid. Preferably, the at least one compound of the α,β-unsaturated dicarboxylic acid and the α,β-unsaturated dicarboxylic acid derivative is maleic acid or maleic anhydride.

In some embodiments, the olefin copolymer may be a maleic anhydride-modified ethylene-octene copolymer. In these embodiments, since the olefin copolymer has good compatibility with the aromatic polyamide resin, plating adhesion of the thermoplastic resin composition can be significantly improved.

In some embodiments, the olefin copolymer may be present in an amount of about 1 wt % to about 20 wt %, for example about 5 wt % to about 15 wt %, based on the total weight of the components (A) to (D). If the amount of the olefin copolymer is less than about 1 wt %, the thermoplastic resin composition can have poor properties in terms of plating adhesion and impact resistance, whereas, if the amount of the olefin copolymer exceeds about 20 wt %, the thermoplastic resin composition can have poor properties in terms of heat resistance and stiffness.

(C) Calcium Carbonate

The calcium carbonate according to the present invention is used in combination with the zinc oxide to allow effective anchoring of a catalyst upon plating, thereby significantly improving plating adhesion of the thermoplastic resin composition, and to improve appearance of the thermoplastic resin composition, and may comprise spherical or particulate calcium carbonate.

In some embodiments, the calcium carbonate may have an average particle diameter (D50, particle diameter corresponding to 50 wt % in a weight cumulative distribution of calcium carbonate particles) of about 0.05 μm to about 6 μm, for example, about 1 μm to about 4 μm, as measured using a particle size analyzer. Within this range, the thermoplastic resin composition can have good properties in terms of plating adhesion and appearance.

In some embodiments, the calcium carbonate may be present in an amount of about 15 wt % to about 35 wt %, for example, about 20 wt % to about 30 wt %, based on the total weight of the components (A) to (D). If the amount of the calcium carbonate is less than about 15 wt %, the thermoplastic resin composition can have poor plating adhesion and mechanical properties, whereas, if the amount of the calcium carbonate exceeds about 35 wt %, the thermoplastic resin composition can have poor impact resistance.

(D) Zinc Oxide

The zinc oxide according to the present invention is used in combination with the calcium carbonate to allow effective anchoring of a catalyst upon plating, thereby significantly improving plating adhesion of the thermoplastic resin composition, and to improve appearance characteristics of the thermoplastic resin composition, and may comprise spherical or particulate zinc oxide.

In some embodiments, the zinc oxide may have an average particle diameter (D50) of about 0.5 μm to about 3 μm, for example, about 1 μm to about 3 μm, as measured using a particle size analyzer. Within this range, the thermoplastic resin composition can have good properties in terms of plating adhesion and appearance.

In some embodiments, the zinc oxide may be present in an amount of about 5 wt % to about 25 wt %, for example, about 10 wt % to about 20 wt %, based on the total weight of the components (A) to (D). If the amount of the zinc oxide is less than about 5 wt %, the thermoplastic resin composition can have poor plating adhesion and mechanical properties, whereas, if the amount of the zinc oxide exceeds about 25 wt %, the thermoplastic resin composition can have poor impact resistance.

In some embodiments, the calcium carbonate (C) and the zinc oxide (D) may be present in a weight ratio (C:D) of about 5:1 to about 1:1, for example, about 4:1 to about 1:1. If the weight ratio of the calcium carbonate to the zinc oxide falls outside this range, the thermoplastic resin composition can have poor properties in terms of plating adhesion and appearance.

The thermoplastic resin composition according to one embodiment of the present invention may further comprise additives used in typical thermoplastic resin compositions. Examples of the additives may comprise a flame retardant, a lubricant, a plasticizer, a heat stabilizer, an antioxidant, a light stabilizer, a colorant, and mixtures thereof, without being limited thereto. When used in the thermoplastic resin composition, the additives may be present in amount of about 0.001 parts by weight to about 40 parts by weight, for example, about 0.1 parts by weight to about 10 parts by weight, relative to about 100 parts by weight of the components (A) to (D).

The thermoplastic resin composition according to one embodiment of the present invention may be prepared in pellet form by mixing the aforementioned components, followed by melt extrusion in a typical twin-screw extruder at about 200° C. to about 320° C., for example, about 280° C. to about 300° C.

In some embodiments, the thermoplastic resin composition may have a plating adhesion strength of about 13 N/cm to about 30 N/cm, for example, about 14 N/cm to about 20 N/cm, as measured on an injection-molded specimen having a size of 10 cm×10 cm×3.2 mm and plated with a 30 μm thick chromium layer at a peeling rate of 50 mm/min using a tensile tester in accordance with JIS C6481.

FIG. 1 is a schematic sectional view of a molded article according to one embodiment of the present invention. It should be noted that the drawing is exaggerated in thickness of lines and/or size of components for descriptive convenience and clarity only. In addition, it should be understood that the present invention is not limited to the drawings and may be realized in various shapes. Referring to FIG. 1, the molded article according to this embodiment comprises: a base layer 10; and a plating layer 20 formed on at least one surface of the base layer 10, wherein the base layer 10 is formed of the thermoplastic resin composition according to the present invention.

In some embodiments, the base layer 10 may be formed in various shapes from the thermoplastic resin composition by various molding methods, such as injection molding, extrusion, vacuum forming, casting, and the like. Such molding methods are well known to those skilled in the art.

In some embodiments, the plating layer 20 may be formed by any suitable method of manufacturing plated plastic products known in the art. For example, the plating layer 20 may be formed by etching the base layer 10 and forming an anchor on an etched region, followed by plating, for example, electroless plating and electroplating, without being limited thereto.

In other embodiments, plating may be performed by typical wet plating or dry plating, such as chemical vapor deposition (CVD), physical vapor deposition (PVD), plasma CVD, or thermal spray coating, besides electroless plating and electroplating.

In addition, a plating process according to the present disclosure may be a typical plating process applicable to a base layer formed of ABS, PC/ABS, and the like. Typically, since a base layer formed of a polyamide resin composition is likely to have a high defect rate upon etching with a typical etching solution, plating of the base layer requires a dedicated etching solution and a dedicated plating line, causing increase in manufacturing costs. However, the base layer formed of the thermoplastic resin composition according to the present invention allows plating using an existing plating line and an existing etching solution without causing such problems.

In some embodiments, the plating layer 20 may comprise at least one of chromium, nickel and copper, and may have a thickness of about 0.1 μm to about 100 μm, without being limited thereto.

The molded article can exhibit good plating adhesion between the base layer and the plating layer, and can secure good properties of the base layer in terms of appearance, impact resistance, and heat resistance. Thus, the molded article can be advantageously used as metallic-appearance interior/exterior materials for automobiles, electronic/electric products, and office automation equipment.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Polyamide Resin (A1) Polyamide 6T/6I (manufacturer: Solvay, product name: A8002, 6T:6I (molar ratio)=about 70:30, glass transition temperature (Tg): about 130° C., intrinsic viscosity [η]: about 0.88 dL/g) was used.

(A2) Polyamide 6T/66 (manufacturer: Solvay, product name: A6000, 6T:66 (molar ratio)=about 55:44, glass transition temperature (Tg): about 90° C., intrinsic viscosity [η]: about 0.89 dL/g) was used.

(A3) Polyamide 6T/6I/66 (manufacturer: Solvay, product name: A1006, 6T:6I:66 (molar ratio)=about 60:30:10, glass transition temperature (Tg): about 120° C., intrinsic viscosity [η]: about 0.85 dL/g) was used.

(A4) Polyamide 66 (manufacturer: Solvay, product name: 23AE1K, glass transition temperature (Tg): about 50° C., intrinsic viscosity [η]: about 1.03 dL/g) was used.

(B) Olefin Copolymer

A maleic anhydride-modified ethylene-octene copolymer (manufacturer: DuPont, product name: Fusabond® N493D) was used.

(C) Calcium carbonate ($CaCO_3$, manufacturer: Omya AG, product name: 2HB, average particle diameter (D50): about 4 μm) was used.

(D) Zinc oxide (ZnO, manufacturer: Hanil Chemical, product name: zinc oxide, average particle diameter (D50): about 2 μm) was used.

Examples 1 to 5 and Comparative Examples 1 to 6

The aforementioned components were mixed in amounts as listed in Tables 1 and 2, followed by extrusion at 300° C., thereby preparing a thermoplastic resin composition in pellet form. Here, extrusion was performed using a twin-screw extruder (L/D: 36, Φ: 45 mm). The prepared pellets were dried at a temperature of 80° C. to 100° C. for 4 hours or more and then subjected to injection molding using a 6 oz injection molding machine (molding temperature: 320° C., mold temperature: 130° C.), thereby preparing a specimen. The prepared specimen was evaluated as to the following properties. Results are shown in Tables 1 and 2.

Property Evaluation (1) Plating adhesion strength (unit: N/cm): Adhesion strength between a base layer and a plating layer was measured on an injection molded specimen having a size of 10 cm×10 cm×3.2 mm and plated with a 30 μm thick chromium layer at a peeling rate of 50 mm/min and a peeling angle of 90° with respect to the surface of the plating layer using a tensile tester in accordance with JIS C6481. Here, the chromium layer had a cut-out at the center thereof to be secured to a fixture of the tensile tester.

(2) Notched Izod impact strength (unit: kgf·cm/cm): Notched Izod impact strength was measured on a ⅛" thick notched Izod specimen in accordance with ASTM D256.

(3) Heat deflection temperature (HDT, unit: ° C.): Heat deflection temperature was measured at a heating rate of 120° C./hr under a load of 1.8 MPa in accordance with ASTM D648.

(4) Surface roughness (unit: GU): Surface roughness was measured on each of the injection molded specimens (size: 100 mm×100 mm×3.2 mm) prepared in Examples and Comparative Examples at a reflection angle of 75° using a gloss meter (Micro-gloss, BYK Co., Ltd.).

TABLE 1

| | | Example | | | | |
|---|---|---|---|---|---|---|
| | | 1 | 2 | 3 | 4 | 5 |
| (A) (wt %) | (A1) | 60 | 50 | — | — | — |
| | (A2) | — | — | 50 | 50 | — |
| | (A3) | — | — | — | — | 50 |
| | (A4) | — | — | — | — | — |
| (B) (wt %) | | 10 | 10 | 10 | 10 | 10 |
| (C) (wt %) | | 20 | 20 | 30 | 20 | 30 |
| (D) (wt %) | | 10 | 20 | 10 | 20 | 10 |
| (C):(D) (weight ratio) | | 2:1 | 1:1 | 3:1 | 1:1 | 3:1 |
| Plating adhesion strength | | 16 | 19 | 14 | 14 | 20 |
| Notched Izod impact strength | | 7.4 | 7.3 | 6.6 | 6.1 | 6.2 |
| Heat deflection temperature | | 134 | 136 | 127 | 128 | 120 |
| Surface roughness | | 101 | 101 | 102 | 102 | 102 |

TABLE 2

| | | Comparative Example | | | | | |
|---|---|---|---|---|---|---|---|
| | | 1 | 2 | 3 | 4 | 5 | 6 |
| (A) (wt %) | (A1) | 50 | — | 50 | — | 50 | — |
| | (A2) | — | 50 | — | — | — | — |
| | (A3) | — | — | — | 50 | — | — |
| | (A4) | — | — | — | — | — | 50 |
| (B) (wt %) | | 10 | 10 | 10 | 10 | 10 | 10 |
| (C) (wt %) | | 40 | 40 | 10 | 40 | 39 | 40 |
| (D) (wt %) | | — | — | 30 | — | 1 | — |
| (C):(D) (weight ratio) | | — | — | 0.33:1 | — | 39:1 | — |
| Plating adhesion strength | | 9 | 11 | 8 | 20 | 19 | 7 |
| Notched Izod impact strength | | 7.0 | 4.9 | 6.5 | 4.1 | 4.1 | 4.3 |
| Heat deflection temperature | | 141 | 129 | 132 | 115 | 120 | 106 |
| Surface roughness | | 101 | 101 | 95 | 93 | 92 | 90 |

From the results shown in Table 1, it can be seen that the thermoplastic resin composition according to the present invention had good properties in terms of plating adhesion, impact resistance, heat resistance, and appearance.

Conversely, the thermoplastic resin compositions of Comparative Examples 1, 2, and 4, free from zinc oxide, had poor plating adhesion, the thermoplastic resin composition of Comparative Example 6, free from zinc oxide and using the aliphatic polyamide resin instead of the aromatic polyamide resin according to the present invention, had poor plating adhesion. In addition, the thermoplastic resin composition of Comparative Example 3, in which the weight ratio of calcium carbonate to zinc oxide (calcium carbonate:zinc oxide: 0.33:1) was less than the range set forth herein, had poor properties in terms of plating adhesion and appearance, and the thermoplastic resin composition of Comparative Example 5, in which the weight ratio of calcium carbonate to zinc oxide (calcium carbonate:zinc oxide: 39:1) exceeded the range set forth herein, had poor properties in terms of impact resistance and appearance.

It should be understood that various modifications, changes, alterations, and equivalent embodiments can be made by those skilled in the art without departing from the spirit and scope of the invention.

The invention claimed is:

1. A thermoplastic resin composition comprising:
    about 45 wt % to about 65 wt % of an aromatic polyamide resin comprising a repeat unit represented by Formula 1, a repeat unit represented by Formula 2, and/or a repeat unit represented by Formula 3;
    about 1 wt % to about 20 wt % of an olefin copolymer;
    about 15 wt % to about 35 wt % of calcium carbonate; and
    about 5 wt % to about 25 wt % of zinc oxide,
    wherein the calcium carbonate and the zinc oxide are present in a weight ratio (calcium carbonate:zinc oxide) of about 5:1 to about 1:1,

[Formula 1]

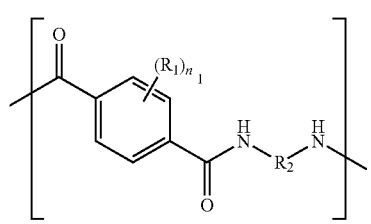

-continued

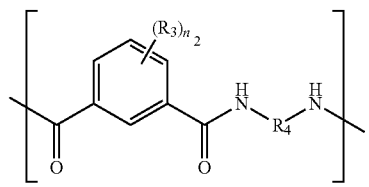
[Formula 2]

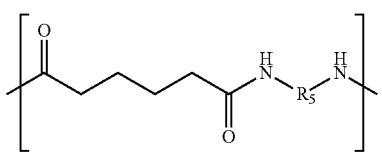
[Formula 3]

wherein $R_1$ and $R_3$ are each independently a $C_1$ to $C_6$ hydrocarbon group or a halogen atom, $R_2$, $R_4$, and $R_5$ are each independently a $C_6$ to $C_{12}$ linear or branched alkylene group, and $n_1$ and $n_2$ are each independently an integer of 0 to 4, and wherein the thermoplastic resin composition has a plating adhesion strength of about 13 N/cm to about 30 N/cm, as measured on an injection molded specimen having a size of 10 cm×10 cm×3.2 mm and plated with a 30 μm thick chromium layer at a peeling rate of 50 mm/min using a tensile tester in accordance with JIS C6481.

2. The thermoplastic resin composition according to claim 1, wherein the aromatic polyamide resin comprises about 60 mol % to about 80 mol % of the repeat unit represented by Formula 1 and 20 mol % to about 40 mol % of the repeat unit represented by Formula 2.

3. The thermoplastic resin composition according to claim 1, wherein the aromatic polyamide resin comprises about 60 mol % to about 80 mol % of the repeat unit represented by Formula 1 and 20 mol % to about 40 mol % of the repeat unit represented by Formula 3.

4. The thermoplastic resin composition according to claim 1, wherein the aromatic polyamide resin comprises about 55 mol % to about 75 mol % of the repeat unit represented by Formula 1, 20 mol % to about 30 mol % of the repeat unit represented by Formula 2, and about 5 mol % to about 15 mol % of the repeat unit represented by Formula 3.

5. The thermoplastic resin composition according to claim 1, wherein the olefin copolymer comprises a maleic anhydride-modified ethylene-octene copolymer.

6. The thermoplastic resin composition according to claim 1, wherein the olefin copolymer comprises: an ethylene-α-olefin copolymer and/or a modified ethylene-α-olefin copolymer obtained by graft-polymerization of an α,β-unsaturated dicarboxylic acid and/or an α,β-unsaturated dicarboxylic acid derivative to the ethylene-α-olefin copolymer.

7. The thermoplastic resin composition according to claim 6, wherein the α,β-unsaturated dicarboxylic acid and/or the α,β-unsaturated dicarboxylic acid derivative comprises maleic acid, maleic anhydride, maleic hydrazide, dichloromaleic anhydride, and/or fumaric acid.

8. A molded article comprising:
a base layer; and
a plating layer formed on at least one surface of the base layer,
wherein the base layer is formed of the thermoplastic resin composition according to claim 1.

* * * * *